UNITED STATES PATENT OFFICE.

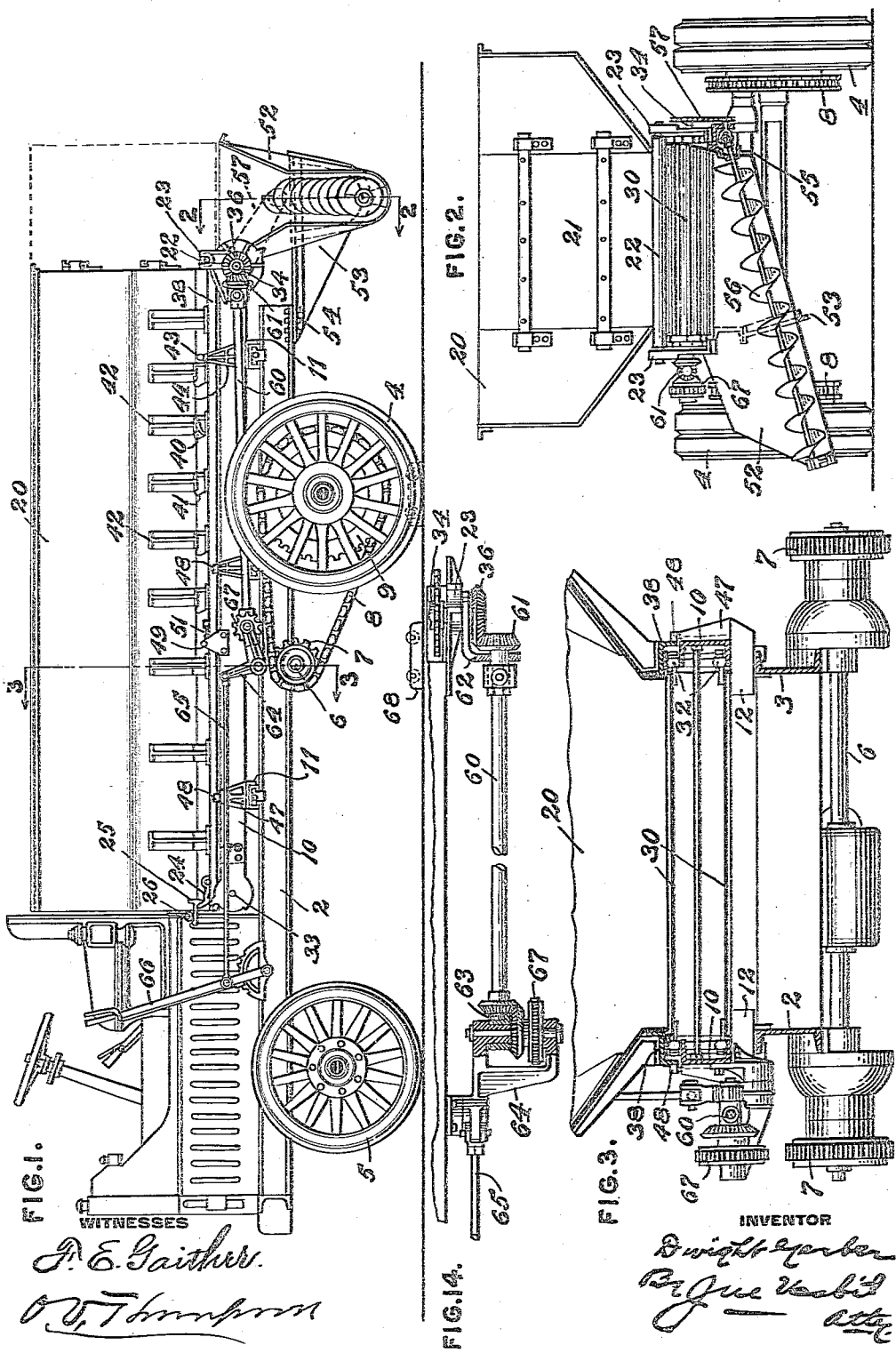

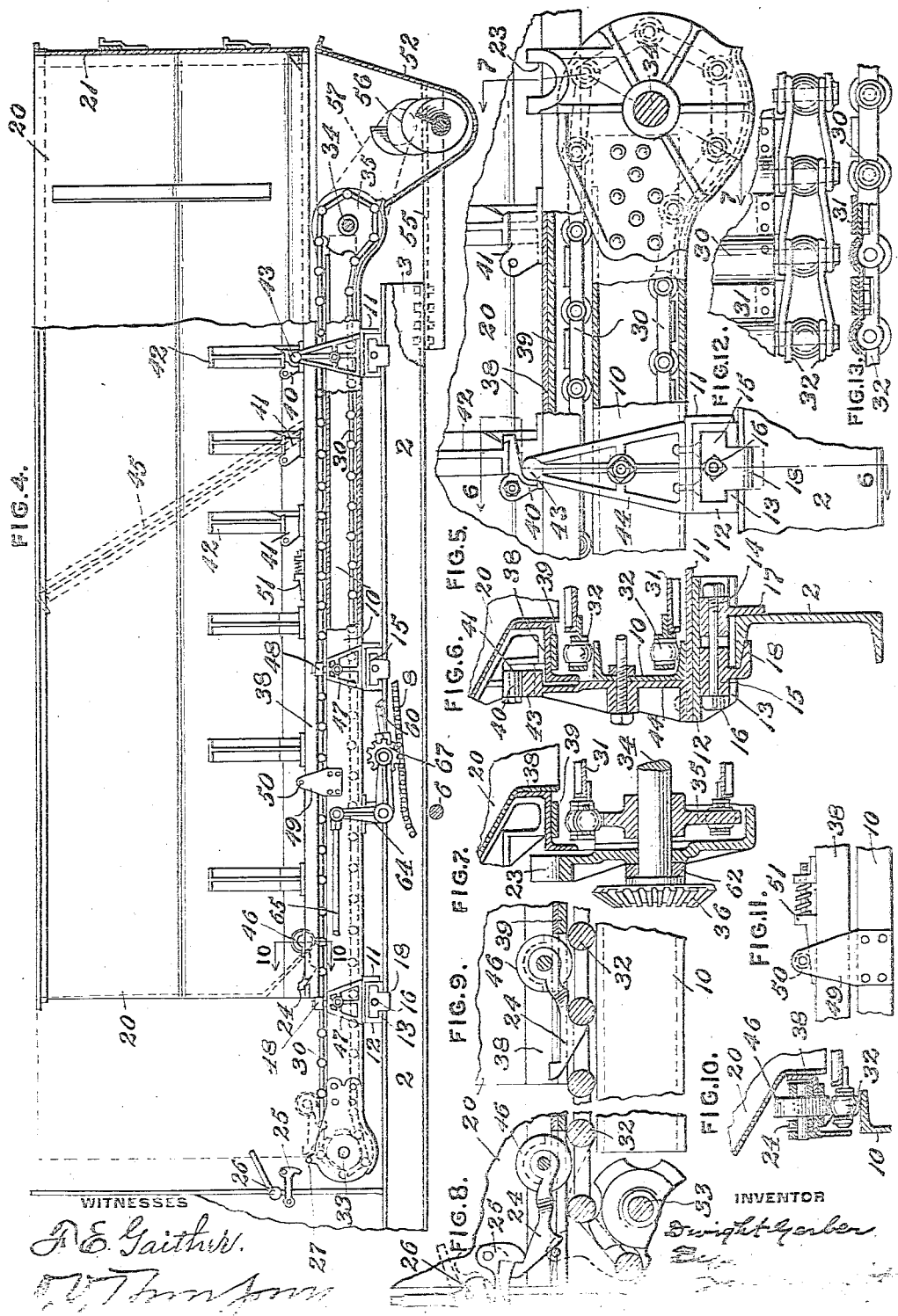

DWIGHT GERBER, OF BELLEVUE, PENNSYLVANIA, ASSIGNOR OF ONE-HALF TO WILLIAM W. KEEFER, OF PITTSBURGH, PENNSYLVANIA.

AUTOMOBILE-TRUCK.

1,075,779.   Specification of Letters Patent.   Patented Oct. 14, 1913.

Application filed August 22, 1912. Serial No. 716,369.

*To all whom it may concern:*

Be it known that I, DWIGHT GERBER, a citizen of the United States, a resident of Bellevue, in the county of Allegheny and State of Pennsylvania, have invented certain new and useful Improvements in Automobile-Trucks, of which the following is a specification.

The object of this invention is to provide an automobile truck which while adapted for general truck service is designed especially for hauling coal, sand, gravel, and other commodities, with means for dumping or discharging the load in one place, or for distributing the load, as for instance gravel on a road.

The invention includes dumping mechanism which is actuated by the vehicle driving means, provision being had for operating the dumping mechanism either when the truck is at a standstill or when it is moving forward.

The invention also includes means for discharging only a portion of the load at a given place, as when a load is made up of say two deliveries of coal, also for discharging the entire load where it comprises a single delivery. It is characteristic of the invention that the load-discharging mechanism is actuated by the truck driving or propelling means, and the several mechanisms whereby all of the foregoing operations are formed are fully described hereinafter.

In the accompanying drawings, Figure 1 is a side elevation of a truck constructed in accordance with the invention. Figs. 2 and 3 are cross sections on lines 2—2 and 3—3, respectively, of Fig. 1. Fig. 4 is a view of the truck body, frame, and load discharging conveyer, portions thereof being shown in side elevation, and other portions in longitudinal section. Fig. 5 is a view of a portion of the rear end of the body frame and conveyer, shown partly in elevation and partly in section. Figs. 6 and 7 are vertical cross sections on lines 6—6 and 7—7, respectively, of Fig. 5. Figs. 8 and 9 are details of the body actuating and securing mechanisms. Fig. 10 is a cross section on line 10—10, of Fig. 4. Fig. 11 is a detail of a wedging device for holding the body against vertical movement. Figs. 12 and 13 are details of one of the endless chains of the load discharging conveyer. Fig. 14 is a detail of the conveyer driving gearing.

Referring to the drawings, 2 and 3 are the opposite longitudinal channel bars of the truck chassis which latter is mounted in any suitable manner on the driving rear ground wheels 4 and front ground wheels 5. Extending transversely of the chassis is shaft 6 with sprocket wheels 7 thereon connected by chains 8 to the larger sprocket wheels 9 on ground wheels 4. The construction thus far described is well known in the art and for which no novelty is claimed, and the same is true of the motor mechanism and the means employed for transmitting power to shaft 6. The present invention contemplates the use of any suitable truck chassis, the improved mechanism being of such construction as is readily adapted to any chassis of usual design.

Superposed on the side channels 2 and 3 of the chassis is a supplemental horizontal frame which consists primarily of the longitudinal inwardly facing channels 10 which parallel bars 2 and 3. Channels 10 are secured to the cross tie elements 11 which rest immediately on bars 2 and 3. As the space between bars 2 and 3 is not uniform in all types of trucks, adjustable means is provided for securing cross ties 11 thereto so that the parts may be fastened together after the superposed mechanism is centered on the chassis. In the preferred adaptation cross ties 11 are in the form of angles, Figs. 4, 5 and 6, and secured in these angles so as to rest on bars 2 and 3 are the short downwardly facing channel-like pieces 12 formed with inturned bottom edges 13. Slidable in each of these channels is a pair of blocks 14 and 15 which are secured together by bolts 16. A wing 17 depending from block 14 engages the flat face of channel bar 2 (or 3), and the hook-like projection 18 on block 15 embraces the flange of channel 2 and operates to clamp channel flanges 13 to the bar when bolt 16 is tightened up. By this means the mechanism is securely fastened to the frame after having been properly centered thereon.

Superposed on the supplemental frame 10 is the bottomless hopper-like body 20 which when hauling a load is in the position shown in Fig. 1 with its rear end coincident with the rear end of the supplemental frame. The rear end wall of the body may be closed by a gate 21, and at the base of the gate-closed opening a transverse roller 22 may be removably mounted in sockets 23 for facilitating the unloading of lumber or other material in lengths that may be hauled on the truck. While the truck body is movable longitudinally of the frame for dumping coal, gravel, and like commodities, it is at all other times secured against such movement, the securing means here shown consisting of a downwardly facing hook 24 mounted adjacent the forward end of the body and adapted to be secured by latch 25, and the latter in turn may be held in locked position by cam 26, Figs. 1 and 8.

An endless conveyer 30, consisting of cross slats 31 and roller chain links 32, is mounted on the transverse shafts 33 and 34 at the front and rear ends, respectively, of supplemental frame 10, shaft 34 being provided with sprocket wheels 35, Fig. 7, around which the conveyer chains move, while at one end of the shaft 34 is beveled gear 36 to which power is transmitted for driving the conveyer. The roller links 32 are adapted to travel on the flanges of channels 10, Fig. 6, and normally the uppermost courses of the roller links support body 20, the lower longitudinal edges of the latter having Z-bars 38 secured thereto with flat track strips 39 on the undersides of these bars which bear on rollers 32, Figs. 7 and 9. The mechanism for actuating the conveyer will be presently described.

When a load of coal or other bulk material is to be discharged from body 20, latch 24 is released and the conveyer set in motion with the upper portion thereof, forming a bottom for body 20, moving in a rearward direction. With body 20 released, it moves rearwardly from the conveyer and provides a cavity or opening through which the contents of the body are discharged. The backward movement of the body is arrested by a wedge-shaped hook-like block 40—one at either side of the body—secured in a socket 41 formed in an upright rib 42 of the body side-sheet, the hook block 40 adapted to ride up on the headed extremity 43 of post or bracket 44 rising from the rear end of frame 10. Post head 43 overhangs the Z-bar 38, Fig. 6, and limits the upward movement of the body, at the same time permitting it to be raised clear of roller links 32, as shown in Fig. 6, and also holding the body against further rearward movement. After the movement of the body has been thus stopped the movement of conveyer 30 beneath the load is continued until the body or so much thereof as is to be dumped is empty.

Wedge blocks 40 may be variously positioned on the body, several of braces 42 being formed with sockets 41 to receive the blocks, as shown in Figs. 1 and 4 so that more or less of the body may be projected from the rear end of the truck as may be desired. Thus, if only a small discharge opening is wanted, as for scattering gravel or other material on a road, the stop blocks are set to permit the body to project only slightly. For larger openings the blocks may be set further forward on the body, as will be understood. In Fig. 4 the body is shown provided with a central partition 45 for dividing a load such as coal into two parts for separate deliveries, and the stop blocks 40 may be at first set to permit the body to move rearwardly for discharging the first portion of the load, and then reset to permit the discharge of the forward portion.

While the wedge-like stop blocks 40 elevate the rear portion of the body so that the conveyer chains may move freely therebeneath, Fig. 6, the front portion of the body is permitted to drag on the roller links, as in Fig. 9, and an oscillating or jarring motion may be imparted to the body by providing it at each side with a roller 46, Figs. 9 and 10, which is adapted to ride over the roller chain links, as in Fig. 10, and then drop therebetween, as in Fig. 9, thus alternately raising and lowering the body which has the effect of shaking the load and keeping it settled on the conveyer.

For returning the body to closed or normal position at the completion of the dumping operation, the direction of movement of conveyer 30 is reversed and hook latch 24, which in the first described movement permits the roller links to move freely therebeneath, engages one of the roller links on the reverse movement, as in Fig. 9, and draws the body and any load that may be contained therein forward into the position shown in Fig. 1, and brings the hook latch into the position shown in Fig. 8, a fixed pin 27 raising the hook latch and causing it to be engaged by catch 25. The longitudinally movable body is held against lateral displacement by the upright guides 47 provided with vertical rollers 48, Figs. 3 and 4, and the body is also held by guides 49 having inwardly extending upper extremities each carrying a roller 50 at its upper end which overhangs Z-bar 38, Figs. 4 and 11, with the spring-held wedges 51 mounted on the Z-bars adapted to wedge beneath rollers 50, thus holding the body against vertical movement when in closed or non-dumping position, see Figs. 1 and 11.

A laterally extending downwardly inclined chute 52 may be arranged at the rear end of the conveyer for directing the discharging load to one side of the roadway, as into a coal hole or pavement vault, the chute being supported by a loop-like bracket 53 removably secured to chassis bar 2, as indicated at 54, Fig. 1, while the upper end of the chute may be removably secured by a support 55 to bar 3, Fig. 4. A worm conveyer 56 within chute 52 for discharging the material therefrom may be driven at its upper end by a chain gearing 57 connecting it with one end of the conveyer shaft 34.

The conveyer driving mechanism consists of a shaft 60, Figs. 1 and 14, provided with pinion 61 at its rear end which meshes with beveled gear 36 on conveyer shaft 34, the rear end of shaft 60 being journaled in a bearing 62 adapted to turn concentrically on shaft 34. Shaft 60 extends forwardly along one side of the frame where it is journaled in bearing or collar 63 which is secured to one arm of bell crank lever 64, the other arm of the lever being connected by link 65 to hand lever 66 arranged within convenient reach of the operator's seat. At bearing 63 shaft 60 is geared to the sprocket wheel 67 which is located immediately above chain 8 which drives the ground wheels. Hand lever 66 serves to raise and lower shaft 60 and sprocket 67, moving the latter in and out of mesh with chain 8, and when meshing therewith it imparts motion to the conveyer as will be understood.

For discharging the load in one place truck wheel 4 is lodged in the roller chair 68, as in dotted lines, Fig. 1, so that it may rotate without advancing the truck, thereby driving the conveyer and discharging the load with the truck at a standstill. When the load is to be distributed along the roadway the sprocket 67 is simply thrown into gear with chain 8 as the truck moves forward.

While the improved truck is designed especially for dumping purposes it is well adapted for general service, the conveyer constituting a substantial bottom. As heretofore indicated, end gate 21 may be removed for hauling lumber and other long pieces of material, the unloading of which is facilitated by roller 22. It will be understood that the removable chute 52 is applied only when it is desired to discharge the load at one side of the road-way.

The body and conveyer mechanisms are of such design as may be readily applied to various types and sizes of truck underframes, and may be readily detached or demounted whenever the chassis is required for other service.

I claim:—

1. The combination of a truck frame, a bottomless body movable longitudinally thereof, an endless conveyer beneath and constituting a bottom for the body and movable independently of the latter, conveyer moving means, and means for limiting the rearward movement of the body.

2. The combination of a truck frame, a bottomless body movable longitudinally thereof, an endless conveyer beneath and constituting a bottom for the body and movable independently of the latter, conveyer moving means, means for limiting the rearward movement of the body, and means for connecting the body to the conveyer for moving the body forwardly after it has been moved rearwardly for discharging the load.

3. The combination of a truck frame, a bottomless body mounted thereon and movable longitudinally thereof for projecting a portion of the body rearwardly beyond the frame, a conveyer movable bodily longitudinally and independently of the frame and constituting a bottom for the body for moving the entire load rearwardly, the backwardly moving load causing the body to move rearwardly therewith, means for limiting the backward movement of the body, means carried by the truck for propelling the same, and means for operatively connecting the conveyer with the propelling means.

4. The combination of a truck frame, a bottomless body mounted thereon, a bottom for the body movable longitudinally of the latter for discharging the contents thereof, and means for shaking the body while the load is being discharged.

5. The combination of a truck frame, a bottomless body mounted thereon and movable longitudinally thereof, adjustable means for stopping the movement of the body for determining the length of the portion thereof projecting beyond the truck frame, a floor for the body movable longitudinally of the latter and of the frame for discharging the contents of the body through the projected portion of the latter, and means for detachably securing together the body and said bottom.

6. The combination of a truck frame, a body mounted on and movable longitudinally of the truck frame, a conveyer constituting a bottom for the body with the conveyer movable toward the rear end of the frame, conveyer driving means, and means for causing the conveyer to move rearwardly either with or independently of the body.

7. The combination of a truck frame, a body mounted on and movable longitudinally of the frame, a bodily movable conveyer movable in reverse directions longitudinally of the frame independently of and constituting a bottom for the body, means limiting the backward movement of the body, means for detachably connecting the conveyer and body for moving the latter forwardly on the truck frame, and conveyer driving means.

8. The combination of a truck frame, a chute at the rear end thereof for directing discharging material away from the truck, a body mounted on and movable longitudinally of the truck frame and adapted at its rear end to be extended over said chute for discharging the load thereinto, and means for moving the load within the body toward the discharge end of the latter.

9. The combination of a truck frame, a chute at the rear end thereof for directing discharging material away from the truck, a bottomless body movable longitudinally of the truck frame and adapted at its rear end to be projected over the chute for discharging the load thereinto, an endless conveyer mounted in the truck frame and forming a bottom for the body and adapted to move the load backwardly and discharge it into the chute, a conveyer within the chute, and driving mechanism common to said conveyers.

10. The combination of a truck frame, ground wheels, ground wheel driving mechanism, a bottomless body mounted on and movable longitudinally of the frame, an endless conveyer mounted in the frame and movable independently of the body, means operated by the ground-wheel-driving mechanism for actuating the conveyer and thereby moving the body with a portion of the latter projecting beyond the frame.

11. The combination of a truck frame, a bottomless body mounted on and movable longitudinally of the frame, an endless conveyer mounted in the frame and constituting a bottom for the body, means for driving the conveyer and thereby moving the bottomless body to extend a portion thereof beyond the frame, and means for limiting the movement of the body without stopping the conveyer whereby the body contents are discharged from that portion of the body which does not extend beyond the end of the frame.

12. The combination of a truck frame, ground wheels, ground wheel driving mechanism mounted on the frame, a bottomless body mounted on and movable longitudinally of the frame for projecting a portion of the body beyond the frame, an endless conveyer mounted in the frame and movable independently of and constituting a bottom for the body, and means actuated by the ground-wheel-driving mechanism for simultaneously moving the conveyer and the body either toward or from the rear end of the truck.

13. The combination of a truck frame, a bottomless body mounted thereon and movable longitudinally thereof to project a portion of the body rearwardly beyond the frame, an endless conveyer mounted in the frame and constituting a bottom for the body, means for moving the conveyer in reverse directions with the load within the body causing the body to move rearwardly on the frame, and means for connecting the body to the conveyer for moving the body in a forward direction.

14. The combination of a truck frame, a bottomless body mounted on the frame, an endless conveyer mounted in the frame and forming a bottom for the body and adapted to discharge the contents thereof, conveyer actuating means, and means for shaking the body while the load is being discharged therefrom.

15. The combination of a truck frame, a bottomless body mounted thereon, an endless conveyer mounted in the frame and forming a bottom for the body and adapted to discharge the contents thereof, conveyer actuating means, and means actuated by the conveyer for shaking the body as the load discharges therefrom.

16. The combination of a truck frame, a bottomless body mounted thereon and movable longitudinally thereof, adjustable means for stopping the movement of the body for determining the length of the portion projecting beyond the truck frame, an endless conveyer mounted in the frame and forming a bottom for the body for discharging the contents thereof through its projected portion, means for moving the conveyer in reverse directions, and means for detachably securing the body to the conveyer.

17. The combination of a truck frame, a bottomless body mounted thereon and movable longitudinally thereof to project a portion of the body beyond the frame, an endless conveyer mounted in the frame and forming a bottom for the body for discharging the contents thereof, means for moving the conveyer in reverse directions with the load in the body operating to move the body rearwardly, and a hook device on the body adapted to engage the conveyer for moving the body in a reverse direction.

18. The combination of a truck frame, a bottomless body mounted thereon and movable longitudinally thereof, hook devices carried by the body, stop devices projecting from the frame and adapted to be engaged by the hook devices, an endless reversely movable conveyer mounted in the frame and forming a bottom for discharging the contents thereof, and means for detachably securing the body to the conveyer.

19. The combination of a truck chassis, a horizontal supplemental frame superposed thereon, a bottomless body mounted on and movable longitudinally of the supplemental frame, an endless conveyer mounted in the supplemental frame and forming a bottom for the body and movable independently of the latter and combining with the load to move the body rearwardly on the supplemental frame, and means for moving the body forwardly on the supplemental frame.

20. The combination of a truck chassis, a horizontal supplemental frame superposed on the chassis, means adjustable transversely of the supplemental frame for securing said frame to the chassis, a bottomless body mounted on the supplemental frame, and an endless conveyer mounted in the supplemental frame and forming a bottom for the body and adapted to discharge the load therefrom.

21. The combination of a truck frame, ground wheels, a body movable on the truck frame, means for limiting the movement of the body, an endless conveyer mounted on the frame and forming a bottom for the body and movable with the latter and also movable independently thereof after the body has reached the limit of its movement, and actuating means common to the ground wheels and to the conveyer.

22. In a truck, the combination of horizontal channel bars at opposite sides thereof, a bottomless body mounted on and movable longitudinally of the channel bars, an endless conveyer provided with rollers which travel on the channel flanges with the conveyer constituting a bottom for the body, and conveyer actuating means.

In testimony whereof I affix my signature in presence of two witnesses.

DWIGHT GERBER.

Witnesses:
J. M. NESBIT,
F. E. GAITHER.